US006627131B2

(12) United States Patent
Huber

(10) Patent No.: US 6,627,131 B2
(45) Date of Patent: Sep. 30, 2003

(54) METHOD FOR INTRODUCING AN ADDITIVE TO A COMPOSITE PANEL

(75) Inventor: Christopher W. Huber, Orangeburg, SC (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 367 days.

(21) Appl. No.: 09/781,025

(22) Filed: Feb. 9, 2001

(65) Prior Publication Data

US 2002/0109254 A1 Aug. 15, 2002

(51) Int. Cl.[7] .......................... B29B 11/12; B29B 11/14; B29C 70/00

(52) U.S. Cl. .......................... 264/122; 264/123; 264/125

(58) Field of Search .................................. 264/109–128

(56) References Cited

U.S. PATENT DOCUMENTS

| | | | | |
|---|---|---|---|---|
| 4,162,344 A | | 7/1979 | Rones | 428/212 |
| 4,478,896 A | | 10/1984 | Barnes et al. | 427/421 |
| 4,751,131 A | * | 6/1988 | Barnes | 428/215 |
| H603 H | | 3/1989 | Avery et al. | 524/56 |
| 4,945,000 A | | 7/1990 | Widmann et al. | 428/407 |
| 4,950,433 A | * | 8/1990 | Chiu | 264/13 |
| 5,067,536 A | | 11/1991 | Liska et al. | 144/361 |
| 5,085,930 A | | 2/1992 | Widmann et al. | 428/323 |
| 5,098,776 A | | 3/1992 | Kobayashi et al. | 428/283 |
| 5,180,784 A | | 1/1993 | Ohmae et al. | 525/207 |
| 5,554,429 A | | 9/1996 | Iwata et al. | 428/105 |
| 5,755,917 A | | 5/1998 | Barnes | 156/296 |
| 5,907,020 A | | 5/1999 | Correll et al. | 525/526 |
| 5,914,153 A | | 6/1999 | Swink et al. | 427/242 |
| 6,010,793 A | | 1/2000 | Yoshimura et al. | 428/537.1 |
| 6,129,871 A | | 10/2000 | Suzuki et al. | 264/51 |

FOREIGN PATENT DOCUMENTS

WO WO 98/07553 2/1998

OTHER PUBLICATIONS

Anon, "High Moisture Content Strandboard Process," *Research Disclosure*, No. 410 Jun., pp. 755–757 (1998).

* cited by examiner

*Primary Examiner*—Stephen J. Lechert, Jr.
(74) *Attorney, Agent, or Firm*—Banner & Witcoff, Ltd.

(57) ABSTRACT

A method of forming a composite panel includes the steps of supplying a material to a forming station, supplying a dry additive to the material at the forming station, producing a mat comprising the material and the additive at the forming station, and applying heat and pressure to the mat to produce a composite panel.

17 Claims, 3 Drawing Sheets

METHOD FOR INTRODUCING AN ADDITIVE TO A COMPOSITE PANEL

INTRODUCTION

The present invention is directed to a method and apparatus of introducing additives to a material used to form a composite panel, and, more particularly, to a method and apparatus of introducing additives, without the use of a blender, to a material used to form a composite panel.

BACKGROUND

Composite panels are typically formed of a raw material that is mixed with a binder. The mixture proceeds to a forming station that produces a mat of material, which is then subjected to heat and pressure in a hot pressing process to form the panel. Exemplary composite panels include oriented strand board (OSB), medium density fiberboard (MDF), wafer board, and particle board.

In a typical manufacturing process for a composite panel, a binder is added to the raw material by mechanical action in a large rotating drum, or blender. Other additives may also be introduced via the blender, either in liquid or powdered form, such as dry catalysts, fire retardants and wax. A typical OSB blender is approximately 12 foot by 30 foot, and rotates at approximately 4–26 rpms. In the manufacture of OSB, for example, a powdered or liquid resin is added to wood flakes that are on the order of 0.025" thick in such a blender. The resin acts as a "spot weld" between the wood flakes during the hot pressing process.

These rotary blenders spray or atomize liquid resin, as well as other liquid additives, into the blender at a rate dependent on the flow of raw material. Application rates in the manufacture of OSB, for example, are typically 2–4% resin solids to wood solids. Powdered resins and additives are blown or mechanically conveyed to the blender. In the case of powdered resin, the resin often falls off during conveying to the forming station.

U.S. Pat. No. 5,914,153 to Swink et al. discloses a blender formed of a tumbling drum for blending resin and wood flakes. Wood flakes are introduced into the tumbling drum. A spinning cup atomizes resin and disperses it into the drum in order to coat tumbling wood flakes.

Adding liquid resin by atomization or spraying in a blender is limiting in that the resin coverage is often inefficient and all the flakes are unevenly coated. In the case where powdered resin is added at a blender, the resin often falls off during conveying to the forming station. Thus, additional resin is required to achieve the required properties for the panel. This adds costs to the manufacturing process, and can negatively impact the properties of the composite panel.

It is an object of the present invention to provide a method and apparatus to introduce powdered additives at a forming station for a composite panel that reduces or wholly overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of preferred embodiments.

SUMMARY

The principles of the invention may be used to advantage to provide a method and apparatus to introduce powdered additives at a forming station used in the manufacture of composite panels. By introducing the additives at the forming station, the need for a blender is eliminated. Further, a more uniform application of the additive, e.g., a binder such as a resin, to the raw material, e.g., wood flakes, can be achieved, as well as reducing the amount of additive required.

In accordance with a first aspect, a method of forming a composite panel includes the steps of supplying a material to a forming station, supplying a dry additive to the material at the forming station, producing a mat comprising the material and the additive, and applying heat and pressure to the mat to produce a composite panel.

In accordance with another aspect, a method of forming a composite panel includes the steps of supplying wood elements to a forming station, adding a dry binder to the wood elements at the forming station, producing a mat comprising the wood elements and the binder; and applying heat and pressure to the mat to form a composite panel.

In accordance with yet another aspect, an apparatus for forming a composite panel includes a reservoir of raw material and at least one forming station configured to form a mat of the raw material. A dry material dispensing assembly introduces an additive to the forming station, and a press applies heat and pressure to transform the mat into a panel.

In accordance with a further aspect, an apparatus for forming oriented strand board includes a reservoir of wood strands and at least one forming station to form a mat out of the wood strands. A plurality of doffing rolls are housed in each forming station and are configured to present a substantially uniform flow of the wood strands as the mat is formed. A dry material dispensing assembly introduces an additive at the doffing rolls. A conveying assembly transfers the mat to a press that includes a heat source and a pressure source configured to form a panel of oriented strand board from the mat.

From the foregoing disclosure, it will be readily apparent to those skilled in the art, that is, those who are knowledgeable or experienced in this area of technology, that the present invention provides a significant advance. Preferred embodiments of the present invention can provide significant cost savings by reducing the capital equipment and materials required to form composite panels, as well as improving the performance characteristics of the composite panels. These and additional features and advantages of the invention disclosed here will be further understood from the following detailed disclosure of preferred embodiments.

BRIEF DESCRIPTION OF THE DRAWINGS

Preferred embodiments are described in detail below with reference to the appended drawings.

Figure 1:
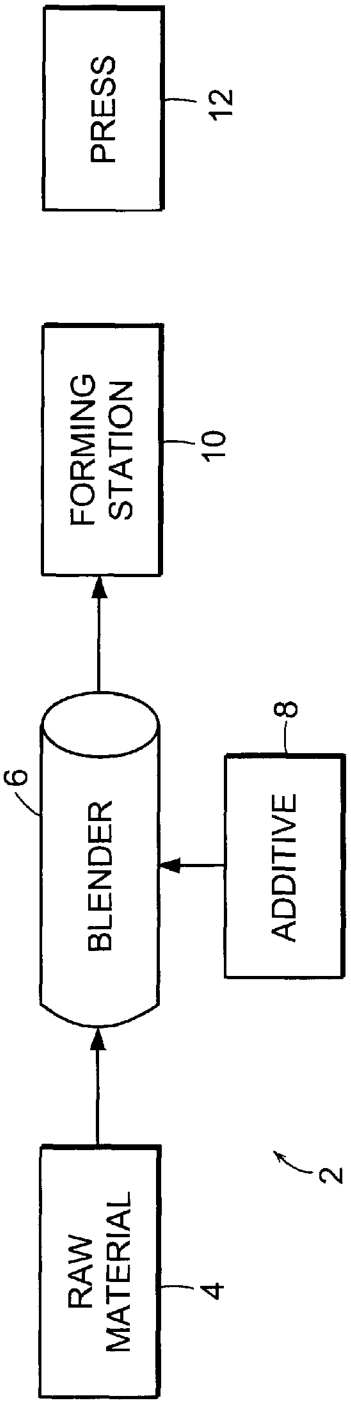
FIG. 1 PRIOR ART
FIG. 1 is a schematic representation of the process of forming a composite panel in accordance with the prior art.

The figures referred to above are not drawn necessarily to scale and should be understood to present a representation of the invention, illustrative of the principles involved. Some features of the apparatus for forming a composite panel depicted in the drawings have been enlarged or distorted relative to others to facilitate explanation and understanding. The same reference numbers are used in the drawings for similar or identical components and features shown in various alternative embodiments. Apparatus for forming composite panels as disclosed herein, will have configurations and components determined, in part, by the intended application and environment in which they are used.

DETAILED DESCRIPTION OF PREFERRED EMBODIMENTS

A manufacturing apparatus 2 for forming a composite panel in accordance with the prior art is shown in FIG. 1. Raw material is supplied from a reservoir 4 to a rotating blender 6. The raw material may be, for example, wood strands used in the manufacture of OSB. An additive 8, e.g., a binder such as an adhesive or a resin, is also introduced into blender 6. Other additives added to blender 6 could include fire retardants and wax. The resin is typically sprayed or atomized as it is introduced into blender 6, thereby dispersing the resin throughout the wood strands tumbling within blender 6. The mixture of wood strands and resin then passes to a forming station where a mat of material is formed. The mat is then conveyed to a press where heat and pressure is applied to form a panel from the mat.

The present invention provides for the introduction of dry additives to a raw material at a forming station in the manufacture of a composite panel, thereby eliminating the need for a blender, and, consequently realizing a significant cost and space savings. A forming station, as used herein, refers to a device or apparatus that converts raw material into a form, e.g., a mat of material, that is suitable for subsequent conversion into a composite panel, typically by the application of heat and pressure later in the process.

One exemplary embodiment of the present invention involves the introduction of a powdered resin to a forming station used to manufacture OSB. The powdered resin is mixed with wood strands at the forming station. By using a powdered resin, rather than the liquid resin that is introduced into the blender of the prior art apparatus shown in FIG. 1, the amount of resin required is reduced, thereby achieving additional cost savings. Additionally, it has been found that powdered resins can be formulated to cure faster than liquid resins.

It is to be appreciated that any suitable dry additive can be added to a raw material during formation of a composite panel in accordance with the present invention. In addition to resin, examples of other dry additives that can be introduced in accordance with the principles of the present invention include catalysts, waxes, fire retardants, and complementary products such as powdered plastics and recycled materials.

Figure 2:
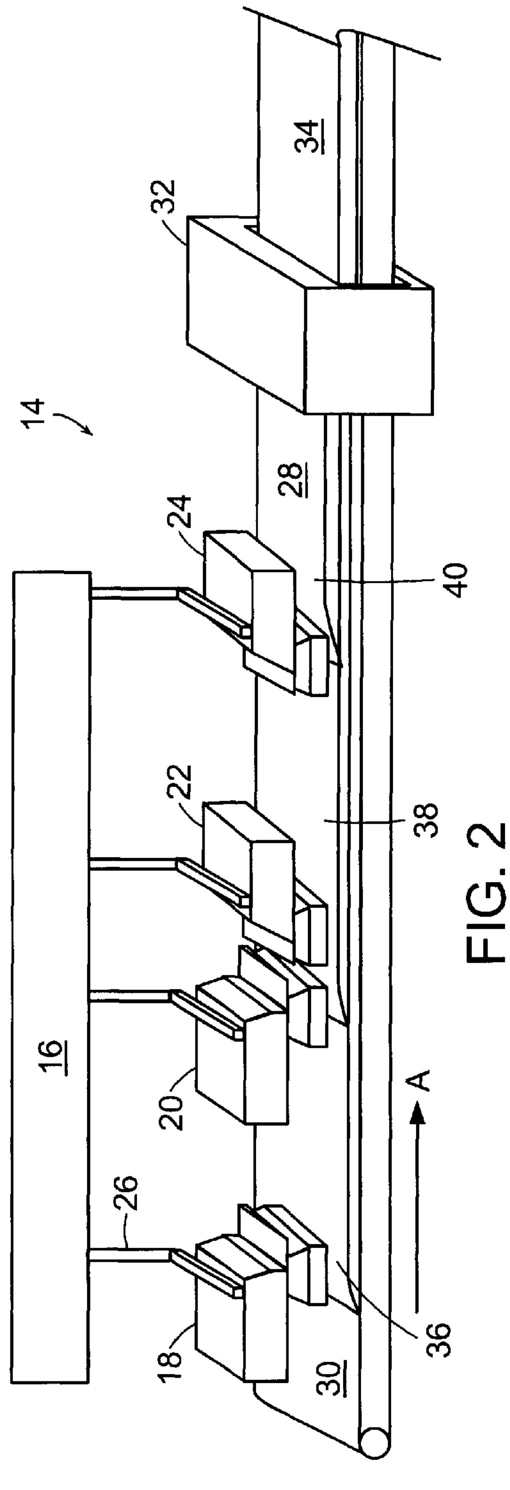
FIG. 2 is perspective view of an apparatus for forming a composite panel in accordance with the present invention.

A preferred embodiment of an apparatus 14 for forming a composite panel in accordance with the present invention is shown in FIG. 2. Such an apparatus is typically operated in a continuous production mode, running 24 hours a day. In the illustrated embodiment, the composite panel being formed is OSB. As noted above, the present invention is applicable to other composite panels, including other wood composite panels. The raw material for a wood composite panel is a wood element, such as wood strands, wood fibers or wood particles. Examples of other wood composite panels that may be formed in accordance with the present invention include, but are not limited to, MDF, wafer board, and particle board.

Apparatus 14 includes a reservoir 16 from which wood strands are supplied to a plurality of forming stations 18, 20,

22, 24. Wood strands suitable for the formation of OSB are typically on the order of approximately 0.25" thick. The multiple forming stations provide for the formation of different layers of the composite panel. It is to be appreciated that the number of forming stations in apparatus 14 may vary, and that apparatus 14 may, in certain preferred embodiments, have a single forming station. Wood strands are transferred from reservoir 16 to forming stations via conveying mechanisms 26. Suitable conveying mechanisms include conduits, pipes, conveying belts, mechanical spreaders, rolls and vibrating distribution equipment.

Forming stations 18, 20, 22, 24 transform the wood strands into a mat 28 that travels along a conveying belt 30 or other conveying device in the direction of manufacture, noted by arrow A, to a press 32. Press 32 is normally a multi-opening or continuous press that compresses the formed mat under heat and pressure to form a composite panel. Heat and pressure are applied to the mat in known fashion in press 32 to form a composite panel 34. In the illustrated embodiment, forming station 18 provides a lower surface layer 36 of mat 28. As surface layer 36 travels along belt 30, forming stations 20, 22 form a core layer 38 of mat 28, overlying surface layer 36. Forming station 24 then provides an upper surface layer 40 of mat 28, overlying core layer 38, such that mat 28 includes three layers in the illustrated embodiment. Depending on the characteristics desired of composite panel 34, mat 28 may have more or less than three layers.

Figure 3:
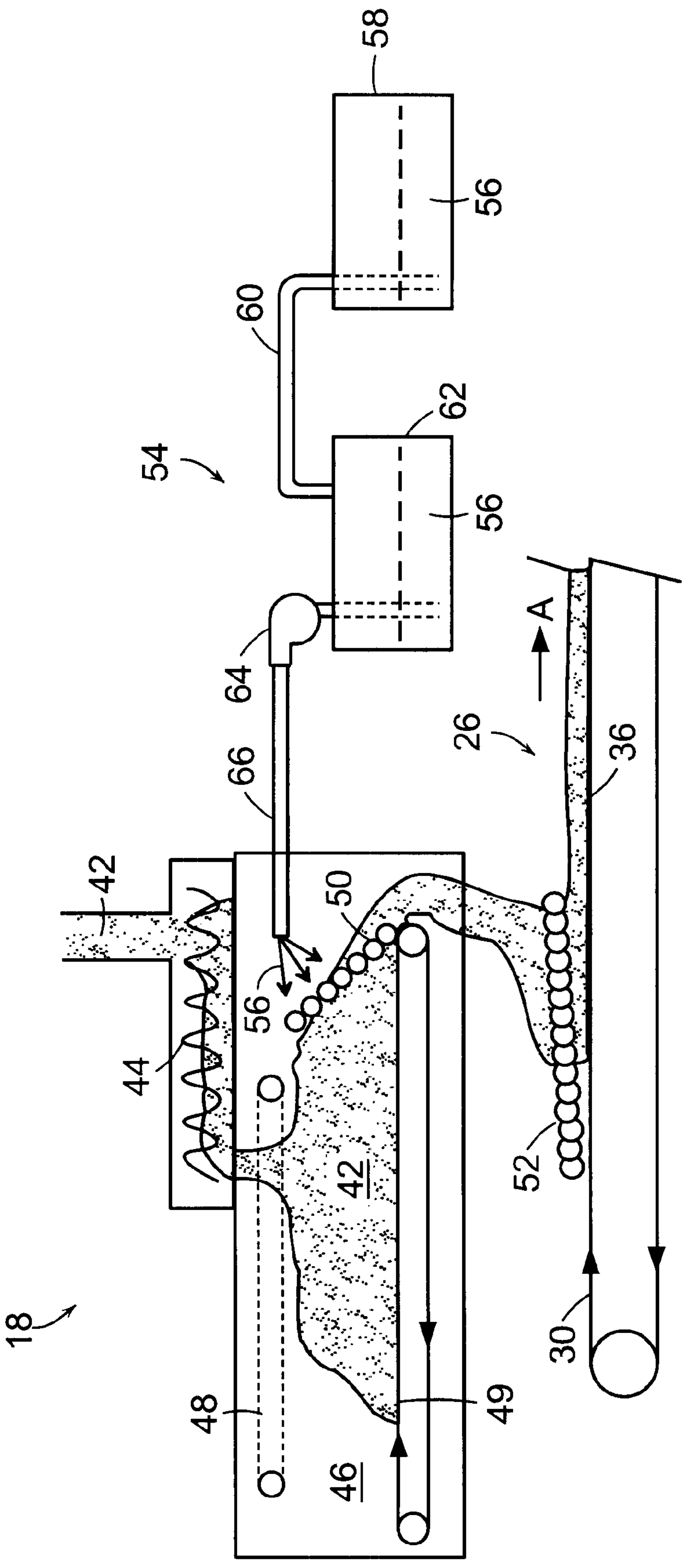
FIG. 3 is a schematic elevation view of a portion of the apparatus of FIG. 2, illustrating components of a forming station.

Turning now to FIG. 3, the addition of a powdered additive at a forming station 18 is illustrated. Wood strands 42 enter forming station 18 and are moved along by a conveying screw 44 or other conveying device into a chamber 46. A leveling rake 48, typically formed of a chain or screw, levels the accumulated wood strands 42 throughout chamber 46 as they are moved along a belt 49. Wood strands 42 are carried along belt 49 and pass through doffing rolls 50 and then down through orienters 52, thereby forming mat 26 on belt 30, which, in the case of the embodiment illustrated in FIG. 2, takes the form of surface layer 36. Doffing rolls 50 are teethed, and serve to evenly distribute wood strands 42 as they are passed to belt 30. Orienters 52 serve to align wood strands 42 in a desired direction along belt 30. Specifically, in the embodiment illustrated with respect to FIGS. 2 and 3, wood strands 42 in surface layers 36, 40 are oriented substantially parallel to the direction of manufacture A, while wood strands 42 in core layer 38 are oriented substantially perpendicular to direction of manufacture A. Such an orientation of the wood strands in the manufacture of OSB provides strength and stability for the composite panel.

A dry material dispenser or applicator 54 introduces an additive 56 to wood strands 42 at forming station 18, preferably at doffing rolls 50. In certain preferred embodiments, additive 56 is an adhesive or binder that is used to adhere wood strands to one another. In the embodiment illustrated herein, the binder is a resin. In particularly preferred embodiments, the resin is a spray dried phenolic resin. Other resins that would be suitable with preferred embodiments of the present invention include, but are not limited to, phenol formaldehyde, isocyanate resin, urea formaldehyde resin, melamine resin, or combinations of other amino resins.

It is to be appreciated that other dry additives can be introduced to the raw material at the forming station in accordance with the present invention. For example, fire retardants, catalysts, waxes that serve as sizing and help control swell properties for the composite panels, plastics and other recyclable materials are all examples of other additives that can be mixed with raw materials in accordance with the present invention.

The action of doffing rolls 50, along with the action of orienters 52, serves to thoroughly mix additive 56 with wood strands 42. By introducing resin at forming station 18, preferably at doffing rolls 50, a better distribution of the resin throughout wood strands 42 is realized since the wood strands are presented at a uniform rate, and the combination of wood strands 42 and resin is thoroughly mixed in the process of forming mat 26. The rate at which the resin is introduced depends on various parameters, including the percentage of resin applied. In certain preferred embodiments, between approximately 1% to 3%, and, more preferably, between approximately 1.8% to 3% resin solids to wood solids are applied to the wood strands in accordance with the present invention. Additional parameters that affect the application of resin include the moisture content and bulk density of the wood strands, and the feed rate of wood strands through the forming station. In the embodiment described above, varying the pressure used in the delivery of the additive will vary the amount of additive provided. The proper amount can easily be calculated, given the feed rate of raw material, or the output rate from the forming station. In certain preferred embodiments, up to 40,000 pounds of wood strands per hour may be fed through the forming station. In certain preferred embodiments, the operating temperature of the resin in the present invention is between approximately 40° F. and 140° F. The operating temperatures for the equipment used in the present invention are similar.

In a preferred embodiment, dry material applicator 54 includes a reservoir 58 housing additive 56. Additive 56 passes from reservoir 58 through a conveying mechanism 60 to a fluidized bed 62. Conveying mechanism 60 can be any suitable mechanism for transferring dry materials, e.g., powdered materials, such as a conveyor, conduit, pipe, distribution rolls, or vibrating conveyor. Fluidized bed 62, in conventional fashion, has a porous plate that air entrains additive 56. Thus, through the use of fluidized bed 62, air is added to additive 56 as it is conveyed from reservoir 58 to wood strands 42. A pumping assembly 64 then conveys additive 56 through a conduit or nozzle 66 from which the additive is ejected onto wood strands 42 proximate doffing rolls 50.

Figure 4:
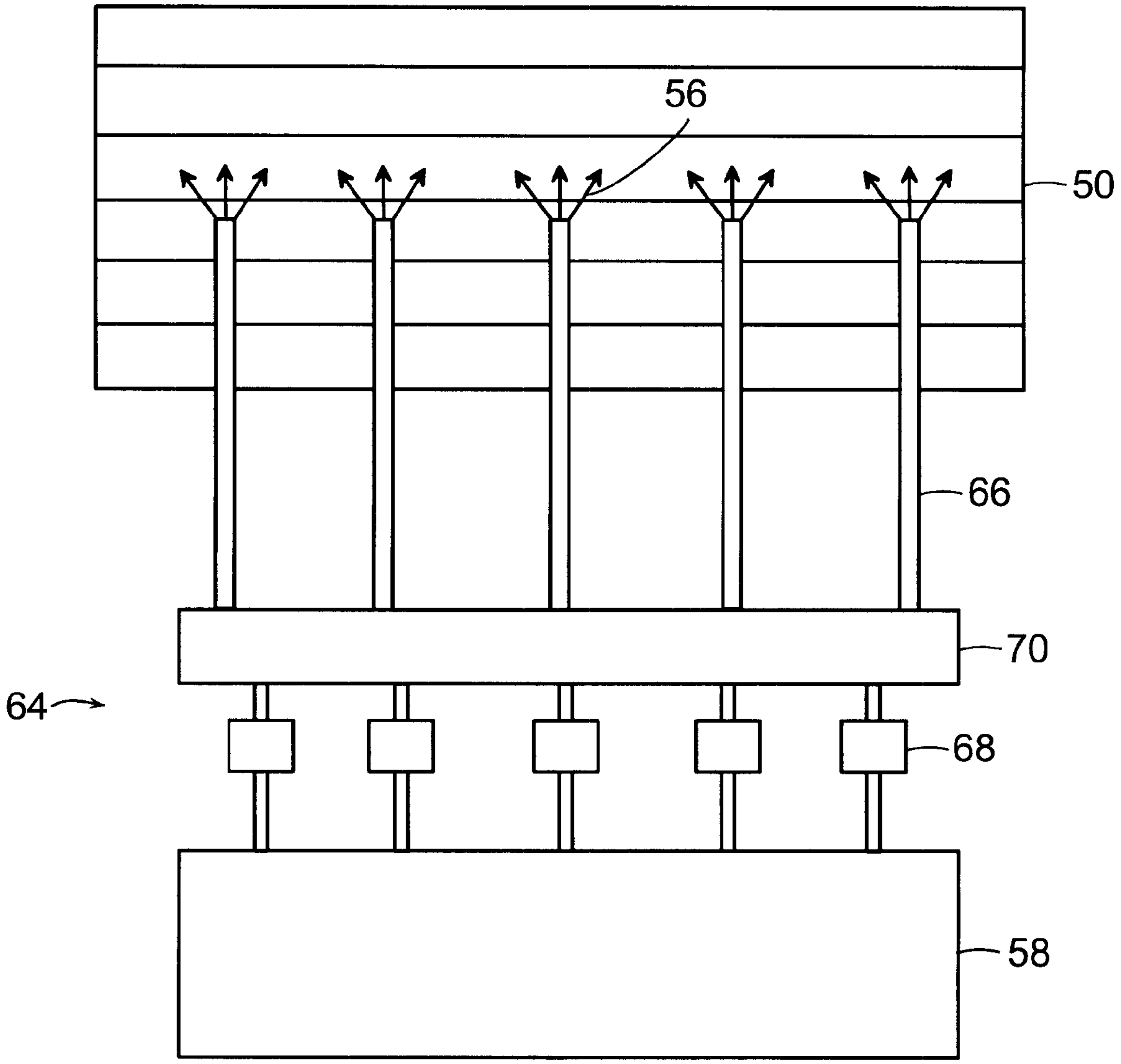
FIG. 4 is a schematic plan view of a pumping assembly of the forming station of FIG. 3.

A preferred embodiment of pumping assembly 64 is illustrated in FIG. 4. Additive 56 is drawn from reservoir 56 by pumps 68 into a header 70 that acts as a manifold to evenly distribute additive 56. In a preferred embodiment, pumps 70 are air operated aspirators. From header 70, additive 56 is forced into nozzles 66 from which it exits as a spray over doffing rolls 50, thereby mixing with wood strands 42. Nozzles 66 may be, in certain preferred embodiments, lengths of conduit, pipe, or tubing.

It is to be appreciated that other devices for introducing dry additives to the forming station are considered within the scope of the invention, including devices that do not introduce air to the additive, as does the illustrated embodiment utilizing a fluidized bed. Any suitable dry material applicator or dispensing apparatus for conveying dry materials to forming station 18 is to be considered within the scope of the invention. For example, mechanical spreaders, conventional blowers, or screw conveyors could be used to supply additive to the forming station. Exemplary dry material dispensers are available from Christy® Machine Company of Freemont, Ohio, and Flexicon of Phillipsburg, N.J.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. A method of forming a composite panel comprising the steps of:

supplying a material to a forming station;

supplying a dry additive to the material at the forming station;

producing a mat comprising the material and the additive at the forming station; and applying heat and pressure to the mat to produce a composite panel.

2. The method of claim 1, wherein the material comprises wood elements.

3. The method of claim 2, wherein the wood elements comprise strands of wood.

4. The method of claim 1, wherein the additive is a binder.

5. The method of claim 4, wherein the binder is a resin.

6. The method of claim 1, wherein the forming station includes a plurality of doffing rolls, the additive being supplied to the material at the doffing rolls.

7. The method of claim 1, wherein the dry additive is supplied to the forming station by a dry material application assembly.

8. The method of claim 7, wherein the dry material application assembly comprises a fluidized bed and a pumping assembly.

9. The method of claim 1, wherein the panel comprises oriented strand board.

10. The method of claim 1, wherein the additive comprises wax.

11. The method of claim 1, wherein the additive comprises a fire retardant.

12. A method of forming a composite panel comprising the steps of:

supplying wood elements to a forming station;

adding a dry binder to the wood elements at the forming station;

producing a mat comprising the wood elements and the binder at the forming station; and applying heat and pressure to the mat to form a composite panel.

13. The method of clam 12, wherein the wood elements are strands of wood and the panel is an oriented strand board.

14. The method of claim 12, wherein the binder comprises a resin.

15. The method of claim 14, wherein the resin is a spray dried phenolic resin.

16. The method of claim 12, wherein the forming station includes a plurality of doffing rolls, the binder being supplied to the material at the doffing rolls.

17. The method of claim 12, wherein the binder is supplied to the forming station by a dry material application assembly.

* * * * *